United States Patent [19]
Scott et al.

[11] Patent Number: 5,569,979
[45] Date of Patent: *Oct. 29, 1996

[54] UV ABSORBING FUSED QUARTZ AND ITS USE FOR LAMP ENVELOPES

[75] Inventors: Curtis E. Scott; Cynthia A. Secen, both of Mentor; Thomas G. Parham, Gates Mills; Gary R. Allen, Chesterland, all of Ohio; Robert L. Bateman, Jr., Southern Shores, N.C.; Paul G. Mathews, Chesterland, Ohio

[73] Assignee: General Electric Company, Schenectady, N.Y.

[*] Notice: The term of this patent shall not extend beyond the expiration date of Pat. No. 5,196,759.

[21] Appl. No.: 312,164

[22] Filed: Sep. 26, 1994

Related U.S. Application Data

[63] Continuation-in-part of Ser. No. 891,136, Jun. 1, 1992, abandoned, and Ser. No. 843,660, Feb. 28, 1992, Pat. No. 5,196,759.

[51] Int. Cl.$^6$ .................................................. H01J 17/16
[52] U.S. Cl. ........................................... 313/636; 313/493
[58] Field of Search .................................. 313/493, 636, 313/112, 578; 501/54, 905

[56] References Cited

U.S. PATENT DOCUMENTS

| | | | |
|---|---|---|---|
| 2,895,839 | 7/1959 | George | 106/52 |
| 3,148,300 | 9/1964 | Graff | 313/221 |
| 3,527,711 | 9/1970 | Barber et al. | 501/54 |
| 3,785,722 | 1/1974 | Schultz | 501/54 |
| 3,848,152 | 11/1974 | Schultz | 313/221 |
| 4,307,315 | 12/1981 | Meulemans et al. | 313/44 |
| 4,361,779 | 11/1982 | van der Steen et al. | |
| 4,814,105 | 3/1989 | Oversluizen et al. | 501/54 |
| 5,028,967 | 7/1991 | Yamada et al. | 350/1.2 |
| 5,196,759 | 3/1993 | Parham et al. | 313/636 |
| 5,236,876 | 8/1993 | Van Hal et al. | 501/64 |

FOREIGN PATENT DOCUMENTS

| | | |
|---|---|---|
| 56-104745 | 8/1981 | Japan . |
| 61-165942 | 7/1986 | Japan . |
| 63-103841 | 5/1988 | Japan . |
| 63-194381 | 8/1988 | Japan . |
| 391074 | of 1973 | U.S.S.R. . |
| 441246 | of 1974 | U.S.S.R. . |

Primary Examiner—Sandra L. O'Shea
Assistant Examiner—Vip Patel
Attorney, Agent, or Firm—Stanley C. Corwin; George E. Hawranko

[57] ABSTRACT

Fused quartz containing europium oxide, titanium dioxide and cerium oxide has been found to be effective for absorbing UV radiation while transmitting visible light radiation. Uses for this material include lamp envelopes and shrouds for halogen-incandescent lamps and metal halide arc discharge lamps which emit both UV and visible light radiation.

19 Claims, 3 Drawing Sheets

UV ABSORBING FUSED QUARTZ AND ITS USE FOR LAMP ENVELOPES

BACKGROUND OF THE INVENTION

This application is a continuation-in-part of U.S. application Ser. No. 08/843,660, filed Feb. 28, 1992, now issued as U.S. Pat. No. 5,196,759. This application is CIP of U.S. application Ser. No. 07/891,136, filed Jun. 1, 1992, now abandoned.

FIELD OF THE INVENTION

This invention relates to UV absorbing fused quartz and its use for electric lamps. More particularly, this invention relates to fused quartz doped with europia, titania and ceria for absorbing UV radiation and its use as lamp envelopes and shrouds for lamps having a source of light which emits both UV and visible light radiation.

BACKGROUND OF THE DISCLOSURE

Fused silica or fused quartz as it is also known is used as a light-transmissive, vitreous envelope material for high intensity lamps, such as gas discharge lamps and halogen-incandescent lamps, because of its excellent transmission of visible light and its ability to withstand high operating temperatures of up to about 1100° C. Almost all arc discharge lamps and many high intensity filament lamps, such as tungsten-halogen lamps, emit ultraviolet (UV) radiation which is harmful to human eyes and skin and which also causes fading of fabrics, plastics and paint and yellowing and/or hazing of many types of plastics employed in lamp fixtures and lenses. Fused quartz is an excellent transmitter of UV radiation and therefore provides no shielding against the emission of such radiation by an arc or filament light source enclosed within a lamp envelope made of fused quartz. As a result, lamps have been developed having a light source which emits both UV and visible light radiation enclosed within a vitreous envelope of fused quartz which contains UV-absorbing materials, or dopants as they are called, so that the lamp envelope will, of itself, absorb the UV radiation emitted by the light source. Illustrative, but non-limiting examples of such efforts in the past are disclosed in U.S. Pat. Nos. 2,895,839; 3,148,300; 3,848,152; 4,307,315 and 4,361,779. However, there is still a need for a vitreous material useful for lamp envelopes, including envelopes which reach a temperature above 500° C during lamp operation, which will absorb UV radiation at wavelengths from 200–380 nm along with minimal absorption of visible light radiation from 380–750 nm. Such a material should also be a homogeneous, colorless, glassy material and any dopants present should be of a type and in an amount which minimizes or avoids chemical reactions between the doped lamp envelope and metal halides and other chemicals present in both an arc discharge lamp and in a halogen-incandescent lamp. The ability of the material to be used at temperatures in excess of 500° C. should not be impaired by the dopants or the material will not be useful for high temperature lamps.

SUMMARY OF THE INVENTION

It has now been found that fused quartz containing oxides of europium, titanium and cerium effectively absorbs UV radiation and transmits visible light radiation, even at temperatures in excess of 500° C. The combination of oxides of europium, titanium and cerium provides UV absorption superior to that achieved by (i) an oxide of each material by itself or (ii) a combination of oxides of titanium and cerium. This material is useful for lamp envelopes and shrouds for both arc discharge lamps and incandescent lamps. Thus, in one embodiment, the invention relates to a lamp comprising a UV emitting light source enclosed within or surrounded by a UV-absorbing and visible light transmitting fused quartz envelope containing oxides of europium, titanium and cerium as UV absorbing dopants. The source of UV radiation may be an arc discharge, either electroded or electrodeless, or it may be an incandescent filament. By fused quartz is meant a vitreous, light transmissive material having an $SiO_2$ content of at least 96 wt. % and preferably at least 99 wt. %.

DETAILED DESCRIPTION

As set forth above, by "fused quartz" in the context of the invention is meant a light-transmissive, vitreous material having an $SiO_2$ content of at least 96 wt. % and preferably at least 99 wt. %. Thus, as defined, the term includes Vycor and vitreous quartz made by fusing natural quartz sand and synthetic silica such as that made by flame pyrolysis methods used for the fabrication of optical blanks and for fiber optics. Fused quartz doped with europium oxide, titanium dioxide and cerium oxide UV absorbants was prepared by mixing the appropriate amounts of high purity natural quartz sand with reagent grade europium oxide ($Eu_2O_3$), titanium dioxide ($TiO_2$) and cerium dioxide ($CeO_2$) in powder form slurried in acetone. Typical impurity levels in the quartz sand used to make both undoped and doped fused quartz are set forth in the table below.

| Impurity Element | Concentration (ppm by Weight) |
|---|---|
| Al | 14.6 |
| Ca | 0.4 |
| Cu | <0.05 |
| Fe | 0.2 |
| K | 0.5 |
| Li | 0.5 |
| Mg | <0.1 |
| Mn | <0.03 |
| Na | 0.6 |
| Ti | 1.1 |
| Zr | 0.5 |

Undoped fused quartz of this purity in the form of tubing useful for making lamp envelopes is available from GE Lighting in Cleveland, Ohio, designated as GE214 Fused Quartz.

In making the UV absorbing fused quartz, a slurry of the high purity natural quartz sand, $Eu_2O_3$, $TiO_2$ and $CeO_2$ was ground until it appeared homogeneous and the resulting dry powder was fused for two hours at 2000° C. under a hydrogen atmosphere to form the doped fused quartz. Another batch was made of the quartz sand, $TiO_2$ and $CeO_2$. The so-made fused quartz contained the following amounts of europium, titanium and cerium expressed in weight parts per million (wppm) of the total quartz composition. Although the measurements reflect the amount of elemental europium, titanium and cerium present, in the fused quartz they are in the form of europium oxide, titanium dioxide and cerium oxide, respectively.

| Batch | Amount of Europium | Amount of Titanium | Amount of Cerium |
|---|---|---|---|
| A |  | 500 | 4000 |
| B | 500 | 500 | 4000 |

Figure 3A:
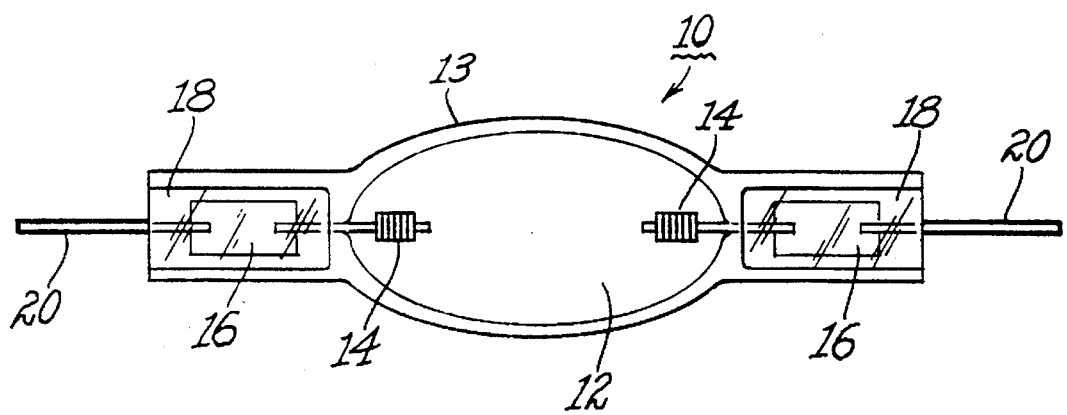
FIG. 3 schematically illustrates an arc lamp and a shrouded arc lamp useful in the practice of the invention.
Figure 3B:
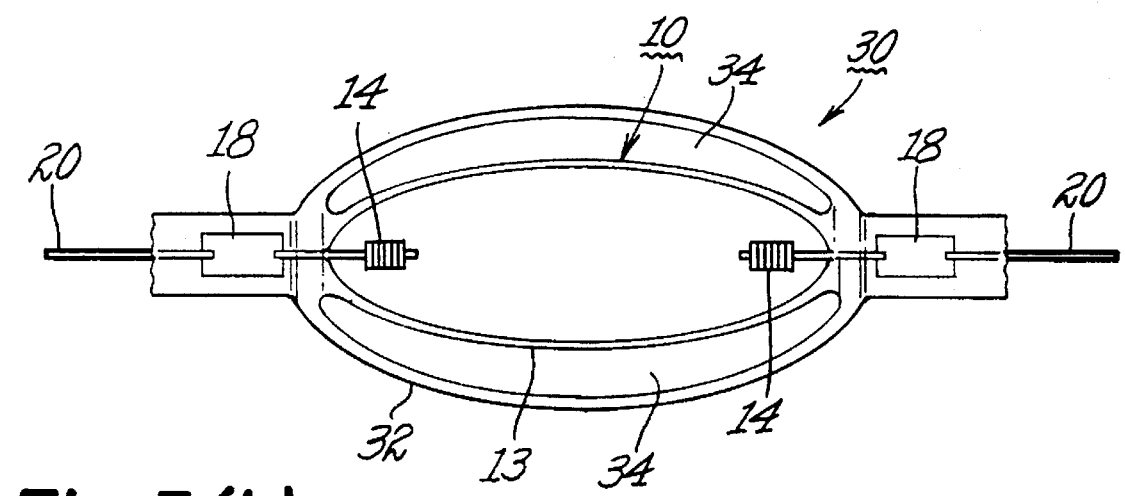

Batch A was used to make both lamp envelopes and shrouds for metal halide arc discharge lamps of the type illustrated in FIG. 3(a) and 3(b) and Batch B was used for shrouds.

The total amount of europium oxide, titanium dioxide and cerium oxide dopants present in the fused quartz is dictated by two factors. One is the chemical reactivity of the atmosphere or fill enclosed within the lamp envelope with the europium, titanium and cerium present in the fused quartz, and the other is the temperature reached by the fused quartz during operation of the lamp. In the former case reaction with the lamp envelope can cause color shift, lumen loss, short lamp life, and devitrification. In the latter case, increasing the amounts of the dopants decreases the useful working temperature of the fused quartz due to devitrification, distortion or sagging and melting. The optimum amount of the europium oxide, titanium dioxide and cerium oxide dopants employed to make the UV absorbing fused quartz of the invention must be determined by the practitioner for each specific case. By way of illustrative, but non-limiting example, the total amount of europium, titanium and cerium in the fused quartz should not exceed (i) 0.3 wt. % if the quartz will reach temperatures of about 1100° C. during lamp operation and (ii) 0.5 wt. % at about 800° C. It is also important that the valence of the titanium in the quartz be plus four and not plus two. If the valence of the titanium is less than plus four (i.e., +2 as in TiO), the quartz becomes black in color instead of clear and light transparent. The upper limit on the amount of $TiO_2$ is somewhat controlled by the fused quartz manufacturing process. If the codoped fused quartz is prepared in a hydrogen reducing atmosphere, exceeding 500 wppm of titanium (i.e., 1000 wppm) has resulted in blackened quartz. The cerium oxide used can be either $Ce_2O_3$, $CeO_2$ or mixture thereof. Finally, the europium oxide, titanium dioxide and cerium oxide dopants may be replaced all or in part by one or more suitable precursors including an organometallic compound such as alkoxide, a sol or a gel, or a halide.

Figure 1:
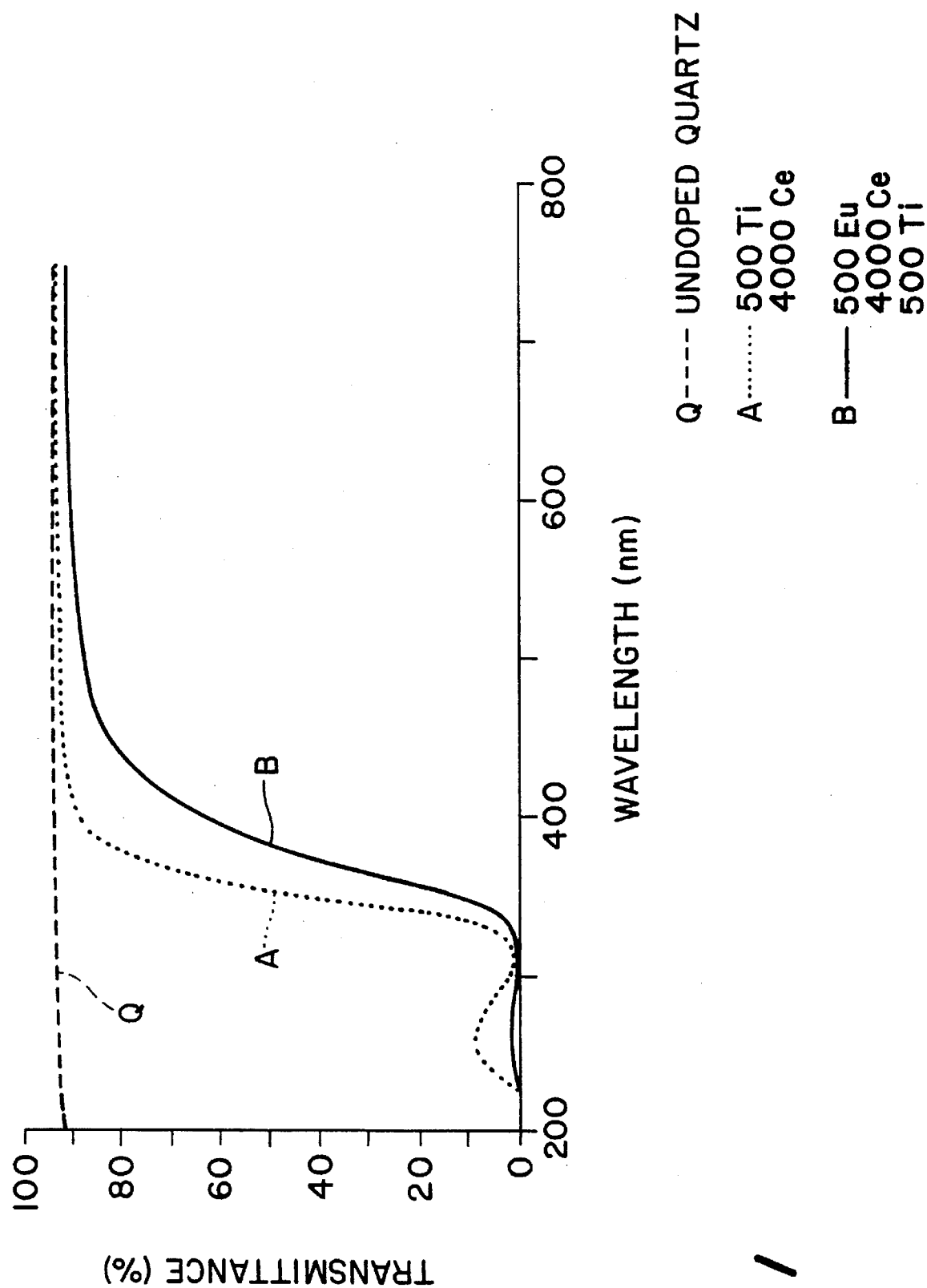
FIG. 1 illustrates the UV and visible light transmission spectra of undoped fused quartz and fused quartz doped with (i) titania and ceria and (ii) europia, titania and ceria.

FIG. 1 illustrates the ultraviolet and visible light transmission spectra from 220–800 nm for 0.7 mm wall thickness fused quartz tubing measured at a distance of 50 cm using a Perkins & Elmer Model Lambda 9 UV/VIS/NIR Dual Beam Spectrometer for (i) undoped fused quartz, (ii) fused quartz doped with 500 wppm titanium and 4000 wppm cerium and (iii) fused quartz doped with 500 wppm europium, 500 wppm titanium and 4000 wppm cerium. The curves for these three materials are labeled in FIG. 1 as Q, A and B, respectively. The europium, titanium and cerium were present in the quartz as europium oxide, titanium dioxide and cerium oxide, as explained above. The tubing was 17 mm ID and had been cut in half lengthwise to make the measurements. The substantial decrease in UV transmittance using the tridoped quartz (Curve B) of the invention is immediately apparent.

Figure 2:
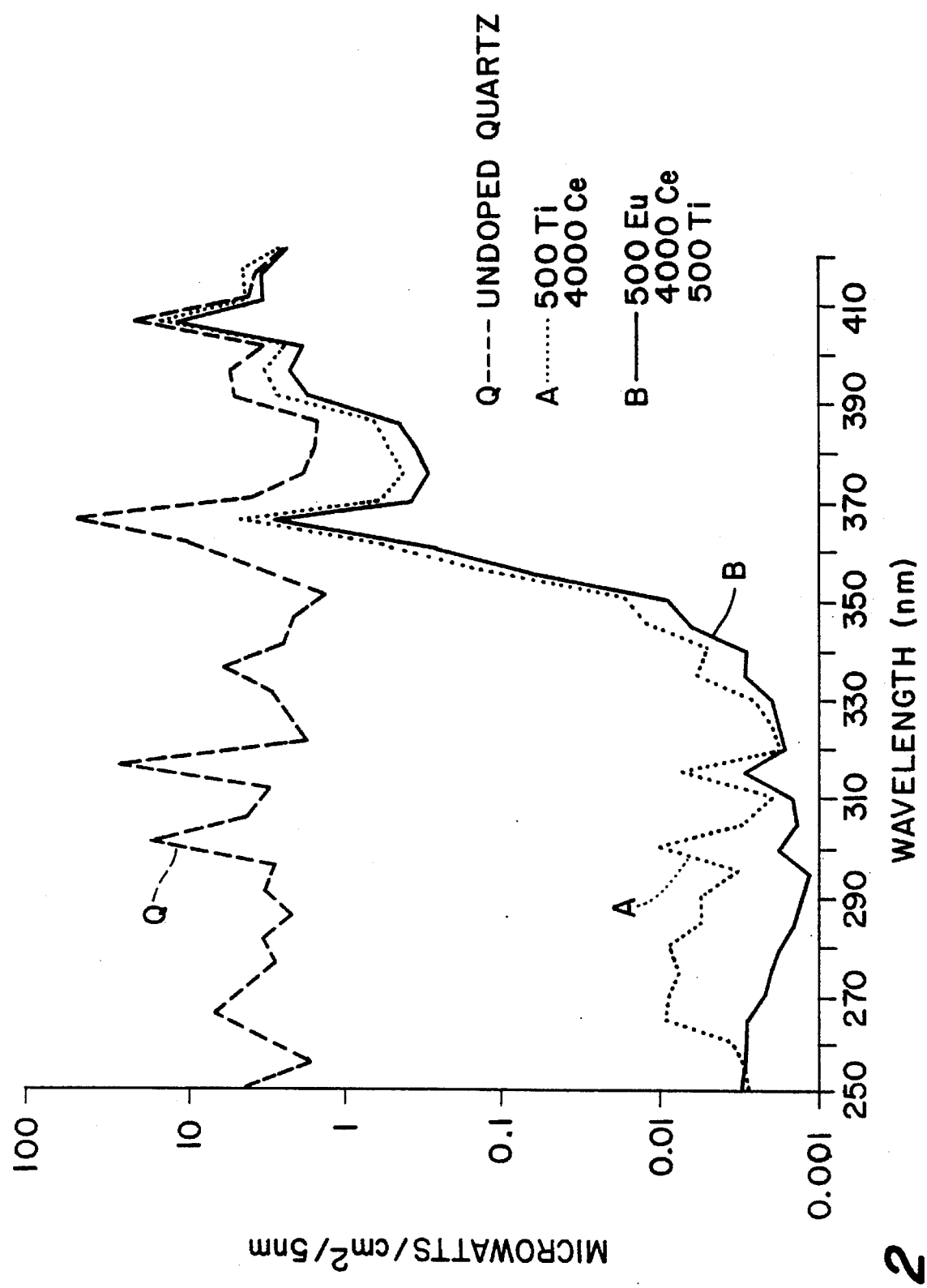
FIG. 2 illustrates the UV emission spectra for shrouded metal halide arc lamps having a fused quartz arc and shroud chamber doped with (i) titania and ceria and (ii) titania and ceria doped arc chamber and europia, titania and ceria doped shroud.

FIG. 2 illustrates the UV spectrum from 250–420 nm for the following 35 watt, DC operated metal halide arc discharge lamps (i) unshrouded arc chamber fabricated from the undoped GE214 lamp tubing designated as Curve Q, (ii) shrouded arc chamber with both chamber and shroud fabricated from fused quartz lamp tubing codoped with titanium dioxide and cerium oxide and containing 500 wppm titanium and 2000 wppm cerium present in the tubing as the oxides designated as Curve A and (iii) shrouded arc chamber with the chamber fabricated from the codoped tubing and a fused quartz shroud fabricated from tubing tridoped with europium oxide, titanium dioxide and cerium oxide and containing 500 wppm europium, 500 wppm titanium and 4000 wppm cerium designated as Curve B. These lamps were of the type briefly and schematically illustrated in FIGS. 3(a) and 3(b). Turning to FIG. 3(a) there is illustrated arc lamp 10 comprising an ellipsoidal arc chamber 12 enclosing within a pair of spaced apart electrodes 14, inert gas, mercury and metal halide (not shown). Electrodes 14 are welded at one end to molybdenum foil seals 16 hermetically shrink sealed in tubular end portions 18. Outer leads 20 are welded to the other end of respective molybdenum foil seals 16 to provide electricity to electrodes 14. Arc chamber 12 is defined by ellipsoidal wall 13 and tubular portions 18 and was formed from a single piece of fused quartz tubing as is well known to those skilled in the art. Lamps of this type were made using both undoped fused quartz tubing and fused quartz tubing codoped with titanium dioxide and cerium oxide as stated above. The arc chamber was a 9 mm×7 mm ellipse having a volume of 0.18 cc and a 1.4 mm wall thickness containing a pair of electrodes, xenon, mercury and a mixture of sodium and scandium iodides. The arc tube operated at 45 VDC and 0.8 amps.

FIG. 3(b) illustrates an embodiment of the invention wherein an arc discharge lamp illustrated in FIG. 3(a) fabricated from fused quartz doped with titanium dioxide and cerium oxide is enclosed within a shroud fabricated from fused quartz tridoped with europium oxide, titanium dioxide and cerium oxide. Employing the doped shroud provides greater UV reduction than can be achieved by doping only the arc tube. Higher dopant levels are used in the shroud because it is at a lower temperature than the arc chamber wall and also because there are no concerns about chemical reactions with metal halides, tungsten or mercury.

Thus, turning to FIG. 3(b), shrouded metal halide arc discharge lamp 16 is illustrated as lamp 10 being hermetically enclosed within shroud 30 comprising envelope 32 made of fused quartz tridoped with europium oxide, titanium dioxide and cerium oxide containing the metals in amounts described above. Shroud 31 forms an integral part of the lamp 35 and a method for fabricating this type of shrouded arc lamp is described in U.S. Pat. No. 4,935,688 the disclosure of which is incorporated herein by reference. The space 34 between the arc chamber wall 13 and the shroud wall 32 was evacuated. Because shroud wall 32 does not get as hot (i.e., 550°–650° C.) as lamp envelope 13 (i.e., 800°–1100° C.) during operation of the lamp, a greater amount of dopants can be employed in the shroud than in the lamp envelope. This results in absorption of greater amounts of UV radiation emitted by the lamp with concomitant less UV emitted into the surrounding ambient.

FIG. 2 illustrates the UV emission spectra for each of the three lamps and one immediately appreciates the significant difference in UV emission between lamps made from codoped fused quartz containing only titanium dioxide and cerium oxide and the same lamps having fused quartz shrouds tridoped with the europium oxide, titanium dioxide and cerium oxide. Applying the NIOSH E&C times revealed that the shrouded lamps had an allowable exposure time almost twenty percent greater than lamps made without the tridoped fused quartz shroud and over an order of magnitude greater than lamps made from undoped fused quartz.

The NIOSH Erythema and Conjunctivitus (NIOSH E&C) value for the unshrouded lamp fabricated from undoped quartz was 1.3 minutes and that of the lamp using a codoped arc chamber and shroud was 38 hours. The NIOSH E&C value using a codoped arc chamber and the tridoped fused quartz of the invention as a shroud was 43 hours. The NIOSH E&C value is a calculated number describing the recommended exposure for a worker in the workplace and refers to UV levels on the worker. It is defined by a U.S. Government document NIOSH 73-1109 "Criteria for a Recommended Standard, Occupational Exposure to UV" published by the U.S. Department of Health, Education and Welfare in 1973. The NIOSH E&C values referred to here relate to the UV exposure time calculated by weighting the emitted UV flux for erythema and conjunctivitus, i.e., skin and eye damage. The value should be greater than 8 hours. The measurements relate the spectral power (in microwatts/sq. cm/nm) to the NIOSH E&C weighting factors to calculate the effective NIOSH E&C exposure time.

The foregoing is intended to be illustrative, but non-limiting with respect to the scope of the invention. Other embodiments will be appreciated by those skilled in the art such as electrodeless arc discharge lamps wherein the arc chamber and/or shroud is fabricated from the tridoped fused quartz according to the invention and incandescent-halogen lamps whose envelopes are fabricated from the tridoped fused quartz of the invention. Further, according to the invention, such lamps may also have a thin film optical interference filter disposed on the wall of the arc or filament chamber or shroud for changing the color of the emitted light or reflecting infrared radiation back to the filament or arc and transmitting visible light radiation.

What is claimed is:

1. A lamp comprising a light source which emits both UV and visible light radiation surrounded by a UV-absorbing and visible light-transmissive fused quartz envelope containing at least 400 wppm europium oxide, at least 50 wppm titanium dioxide and at least 1000 wppm cerium oxide to absorb at least a portion of said UV radiation.

2. The lamp of claim 1 wherein said quartz envelope has an $SiO_2$ content of at least 96 wt. %.

3. The lamp of claim 2 wherein at least one halogen is enclosed within said envelope.

4. The lamp of claim 1 wherein said quartz envelope has an $SiO_2$ content of at least 99 wt. %.

5. The lamp of claim 4 wherein said filament is a tungsten filament.

6. The lamp of claim 1 wherein said source of UV and visible light radiation comprises a filament.

7. The lamp of claim 6 wherein said envelope has an $SiO_2$ content of at least 96 wt. %.

8. The lamp of claim 7 wherein said titanium in said quartz is present in a valence state of plus four.

9. The lamp of claims 6 comprising a halogen-incandescent lamp.

10. The lamp of claim 1 wherein said source of UV and visible light radiation comprises an arc discharge.

11. The lamp of claim 10 including at least one metal halide in said arc discharge.

12. An incandescent lamp having a light source comprising a filament light source hermetically sealed within a fused quartz envelope, wherein said light source emits both UV and visible light radiation and wherein said fused quartz envelope is doped with at least 400 wppm europium oxide, at least 50 wppm titanium dioxide and at least 1000 wppm cerium oxide to absorb at least a portion of said UV radiation emitted by said light source.

13. An arc discharge lamp comprising an arc discharge which emits both UV and visible light radiation enclosed within a visible, light-transmissive envelope made of fused quartz having an $SiO_2$ content of at least 96 wt. % which is doped with europium oxide, titanium dioxide and cerium oxide to absorb at least a portion of said UV radiation emitted by said arc discharge, and containing at least 400 wppm of europium dopant, at least 1000 wppm of cerium dopant and at least 50 wppm of titanium dopant.

14. The lamp of claim 13 further including at least one metal halide in said arc discharge.

15. The lamp of claim 14 wherein said arc discharge is an electrodeless arc discharge.

16. An arc discharge lamp comprising an arc discharge which emits both UV and visible light radiation enclosed within a fused quartz arc chamber and wherein a fused quartz shroud having an $SiO_2$ content of at least 96 wt. % codoped with europium oxide, titanium dioxide and cerium oxide surrounds said arc chamber to absorb at least a portion of said UV radiation emitted by said arc discharge, said fused quartz shroud containing at least 400 wppm of europium dopant, at least 1000 wppm of cerium dopant and at least 50 wppm of titanium dopant.

17. A vitreous, light-transmissive material having an $SiO_2$ content of at least 96 wt. % which contains at least 1000 wppm of cerium dopant, at least 400 wppm of europium dopant and at least 50 wppm of titanium dopant.

18. Vitreous, light-transmissive fused quartz which transmits visible radiation, but absorbs UV radiation, said fused quartz having an $SiO_2$ content of at least 96 wt. % and containing at least 400 wppm of europium dopant, at least 1000 wppm of cerium dopant and at least 50 wppm of titanium dopant.

19. The quartz of claim 18 wherein said $SiO_2$ content is at least 99 wt. %.

* * * * *